United States Patent [19]
Dent et al.

[11] Patent Number: 5,187,675
[45] Date of Patent: Feb. 16, 1993

[54] MAXIMUM SEARCH CIRCUIT

[75] Inventors: Paul W. Dent, Stehag, Sweden; Jaap C. Haartsen, Durham, N.C.

[73] Assignee: Ericsson-GE Mobile Communications Holding Inc., Paramus, N.J.

[21] Appl. No.: 761,380

[22] Filed: Sep. 18, 1991

[51] Int. Cl.[5] .............................................. G06F 7/38
[52] U.S. Cl. ............................ 364/715.06; 340/146.2
[58] Field of Search ................ 340/146.2; 364/715.06, 364/769

[56] References Cited

U.S. PATENT DOCUMENTS

| | | | |
|---|---|---|---|
| 3,740,538 | 6/1973 | Hemphill | 364/715.06 |
| 4,567,572 | 1/1986 | Morris et al. | 340/146.2 |
| 4,644,560 | 2/1987 | Torre et al. | 375/1 |
| 4,783,780 | 11/1988 | Alexis | 370/95 |
| 4,850,033 | 7/1989 | Eizenhofer et al. | 455/56 |
| 4,901,307 | 2/1990 | Gilhousen et al. | 370/18 |
| 4,903,005 | 2/1990 | Sakashita et al. | 340/146.2 |
| 4,930,140 | 5/1990 | Cripps et al. | 375/1 |
| 4,965,850 | 10/1990 | Schloemer | 455/33 |
| 4,984,247 | 1/1991 | Kaufmann et al. | 375/1 |
| 5,022,049 | 6/1991 | Abrahamson et al. | 375/1 |
| 5,038,399 | 9/1991 | Bruckert | 455/33 |
| 5,056,109 | 10/1991 | Gilhousen et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |

OTHER PUBLICATIONS

"On the Capacity of a Cellular CDMA System", K. Gilhousen, IEEE Trans. on Vehicular Technology, vol. 40, No. 2, May 1991.

"Very Low Rate Convolutional Codes for Maximum Theoretical Performance of Spread-Spectrum Multiple-Access Channels", A Viterbi, IEEE Journal on Selected Areas in Communications, vol. 8, No. 4, May 1990.

Primary Examiner—Jerry Smith
Assistant Examiner—Chuong D. Ngo
Attorney, Agent, or Firm—Burns, Doane, Swecker & Mathis

[57] ABSTRACT

An electronic comparator for selecting and outputting the larger of first and second electrical, binary-coded input values presented bit-serially, most-significant-bit first, has first and second input terminals; a logical exclusive-OR gate; a first resettable flip-flop; a second flip-flop; and a device for selecting one of the input values as an output of the comparator. In a second embodiment, the electronic comparator has first and second input terminals; a logical exclusive-OR gate; a first flip-flop synchronized with a train of bitclock pulses; a second resettable flip-flop; a third flip-flop; and a device for selecting one of the input values as an output of the comparator. Devices for generating traceback signals indicating which input values were selected and a signal indicating that the maximum value has been identified are also disclosed.

10 Claims, 4 Drawing Sheets

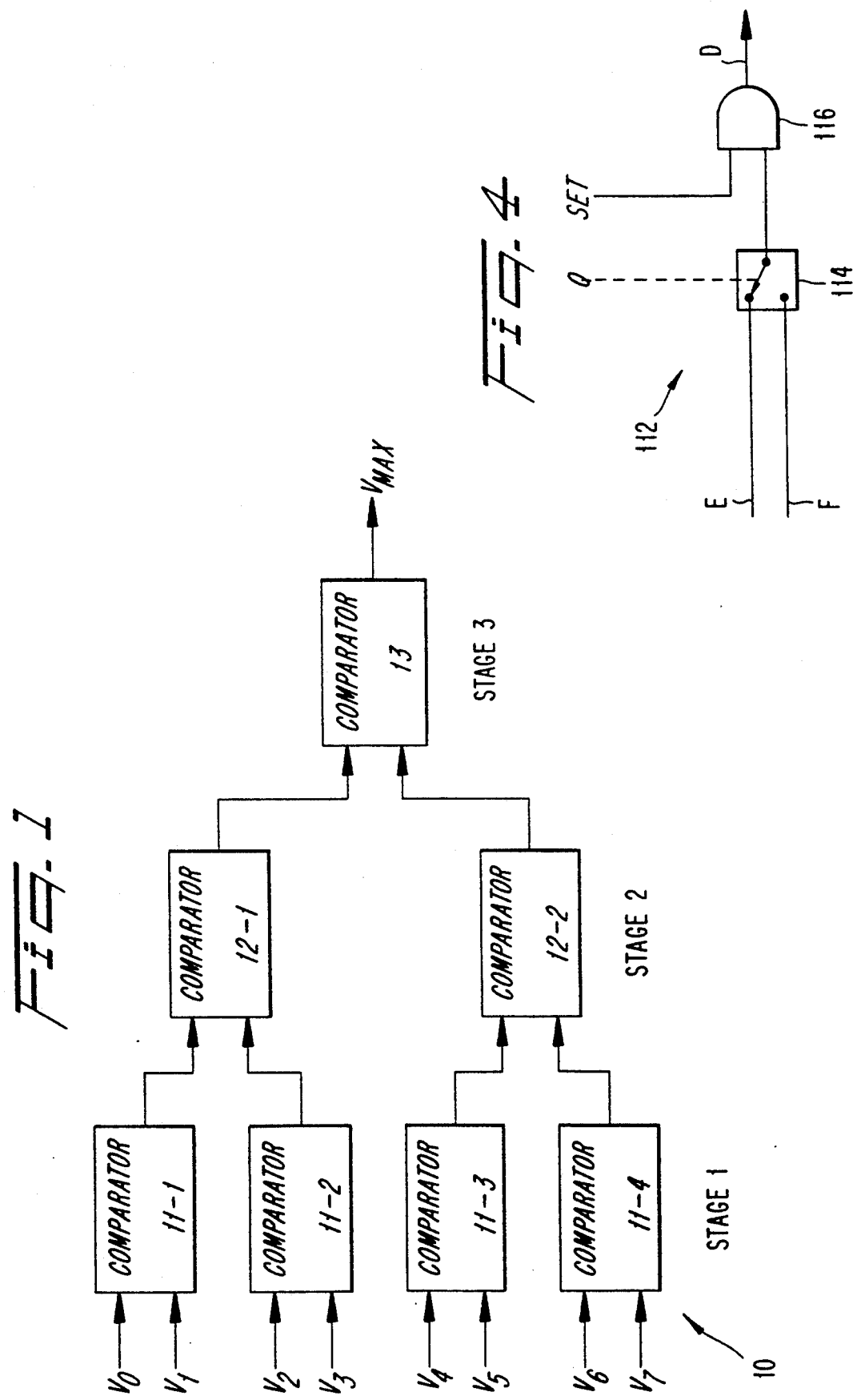

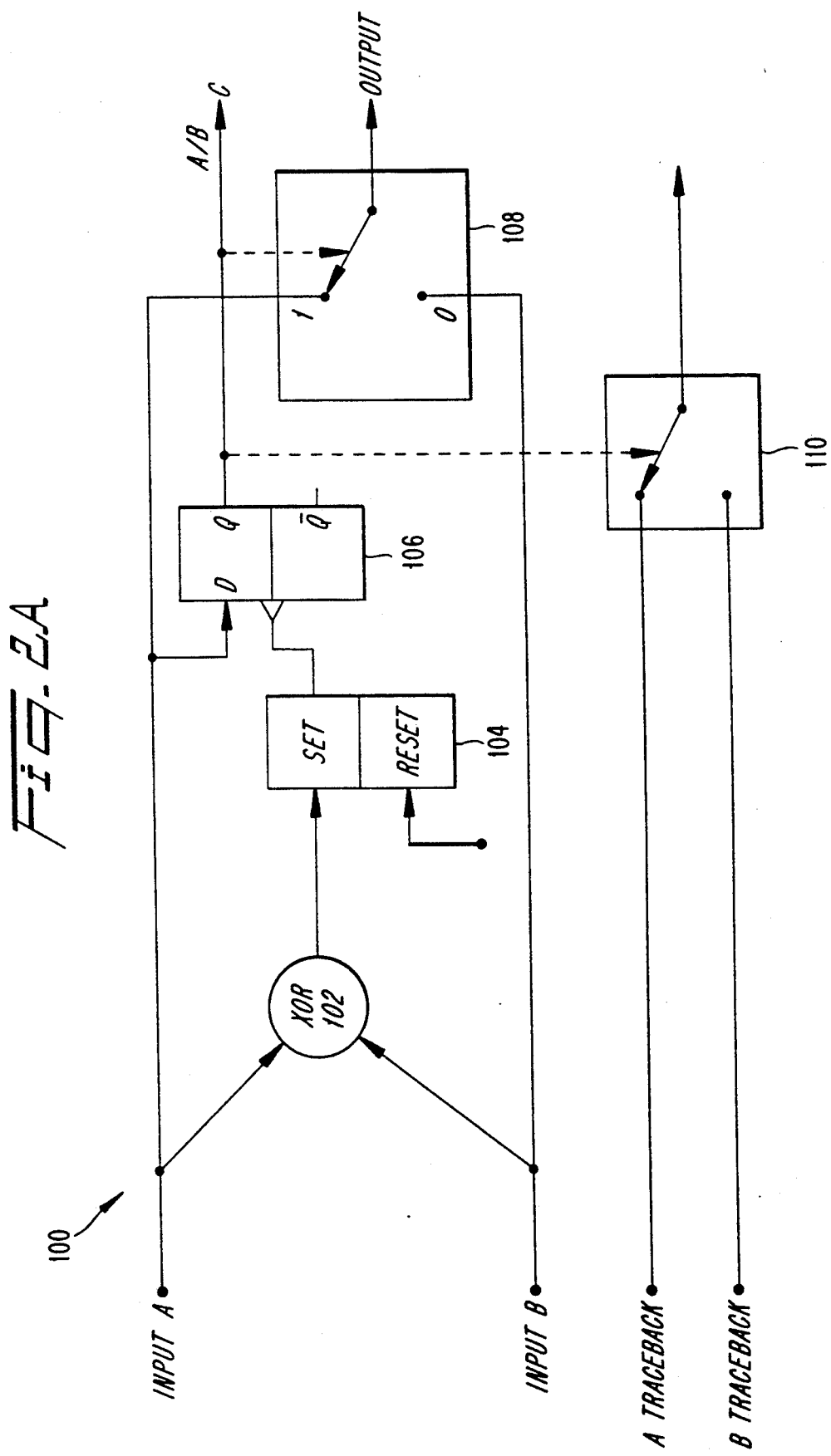

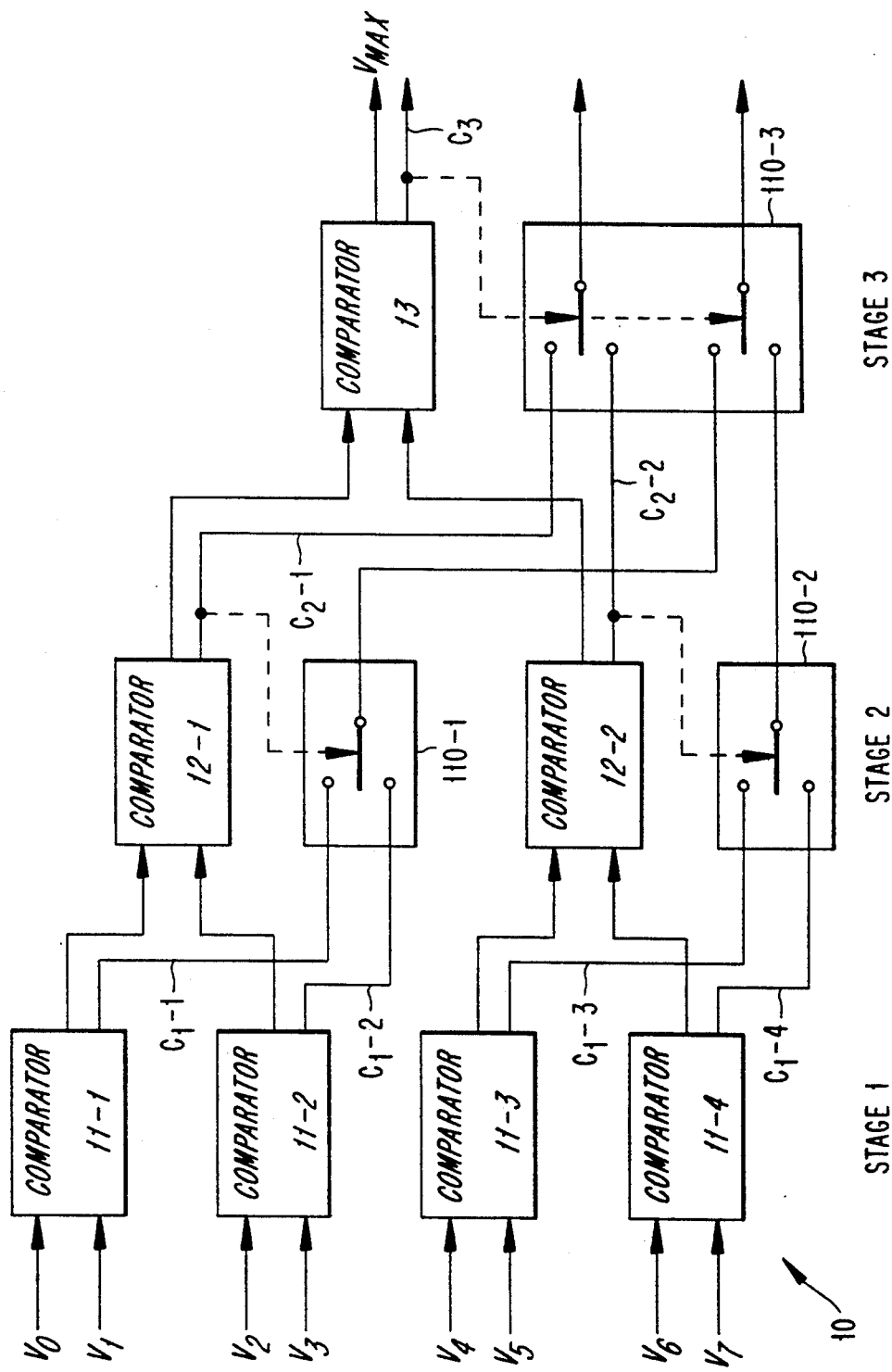

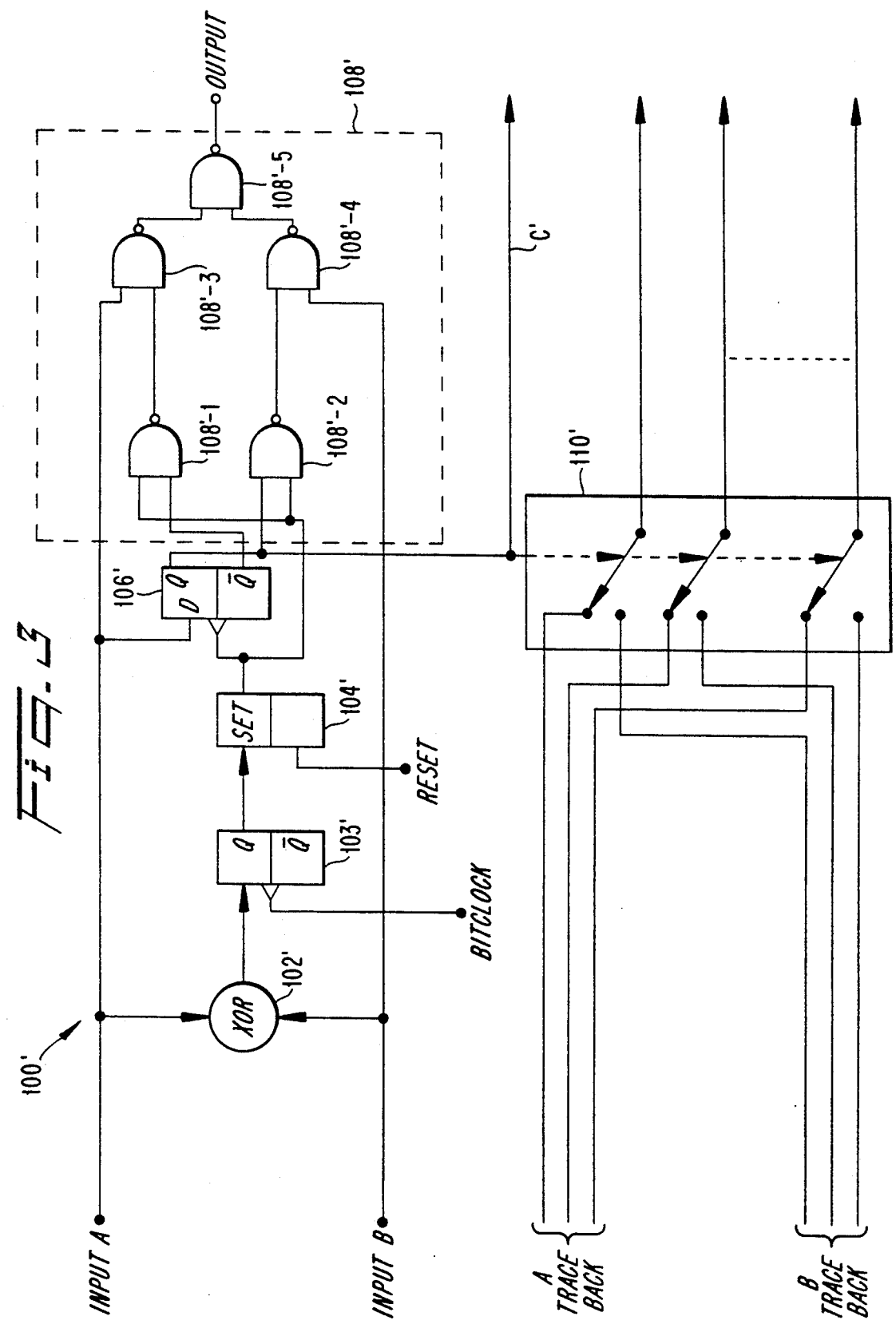

MAXIMUM SEARCH CIRCUIT

BACKGROUND

The present invention generally relates to methods and apparatus for digital signal processing or computational operations.

It is sometimes desired to find the greatest of a set of values that may be electrically stored as a set of digital words in memory elements such as registers, random access memory ("RAM") or read-only memory ("ROM"). Also, it is often desired to identify the largest such value, e.g., by finding its associated index number, which may be the number of the memory element in which the largest value is stored.

A common method for finding the largest of a set of values involves sequentially scanning the set. A register for storing the largest value is loaded with the first value (and its index), and the contents of the register is compared to the second value. If the second value is larger, the second value and its index replace the first value and its index in the register. The third value is then compared to the register contents, and if it is larger, the third value and its index replace the value and index stored in the register. The process continues until all subsequent values in the set have been compared to the register contents.

Unfortunately, the amount of time needed for such a sequential search is proportional to the number of values in the set; thus, a sequential search may be too slow when the set is large. As described in more detail below, the present invention provides a fully parallel search method and circuit implementation using bit-serially presented digital values that determine the maximum value and its index in a time period that is independent of the number of values in the set searched.

The present invention is particularly useful for code division multiple access ("CDMA") communications techniques in cellular radio telephone communication systems, such as the enhanced CDMA demodulation scheme based on successive signal subtractions, in signal strength order, of multiple CDMA signals that is described in co-pending U.S. Patent application Ser. No. 07/628,359, filed Dec. 17, 1990;

In that co-pending patent application, it is explained that superior methods of spectrally spreading an information signal, such as occurs in a CDMA system, use error correction coding. When a single information bit is expanded into a pseudo-random sequence of R bits, the information bandwidth is spread without error-correction-coding gain; this technique may be termed "simple spreading". On the other hand, spreading a block of M information bits, where $M > 1$, into a pseudo-random sequence of $M \times R$ bits provides an error correction coding gain of the spreading ratio R. This technique, called "intelligent spreading", can involve either orthogonal or bi-orthogonal block coding of the information signal to be transmitted.

In orthogonal block coding, M bits to be transmitted are converted to one of $2^M$ available $2^M$-bit orthogonal codewords. Decoding involves correlating a received signal with all members of the set of orthogonal codewords, and the index of the codeword giving the highest correlation yields the desired information. For example, if a signal's correlation with sixteen 16-bit codewords index-numbered 0 to 15 produces the highest correlation on the tenth codeword, the desired signal information is the 4-bit binary word 1010 (decimal 10).

A comparison processor may determine which correlation has the largest magnitude and may set that signal to zero by opening a corresponding switch. In this manner, the demodulated signal is subtracted effectively from the composite signal. The remaining spectrum with one component removed is processed and re-scrambled to reconstruct the original signal samples less the just-decoded signal. The magnitude of the correlated signal is representative of signal strength and may be stored in a sorting processor along with the signal's corresponding scrambling code. The processor orders the scrambling codes from greatest to weakest correlated signal magnitudes, and the code corresponding to the greatest magnitude may then be transmitted to the descrambler for the next signal demodulation.

Thus, after the comparison processor detects real and imaginary correlations and determines complex correlation magnitudes by calculating the square root of the sum of the squares of the real and imaginary components, the processor may then determine which complex correlation has the greatest magnitude. The real and imaginary components of the selected correlation may also be analyzed in the complex plane to determine if the phase has changed.

SUMMARY

In one embodiment, the present invention provides an electronic comparator for selecting and outputting the larger of first and second electrical, binary-coded input values presented bit-serially, most-significant-bit first, comprising: first and second input terminals; a logical exclusive-OR gate operatively connected to the first and second input terminals for forming a signal indicating a logical exclusive-OR of the first and second input values; a first resettable flip-flop operatively connected to the logical exclusive-OR gate, wherein an output of the first flip-flop is set from a "0" state to a "1" state when the exclusive-OR gate signal indicates the first and second input values are unequal; a second flip-flop operatively connected to the first flip-flop and the first input terminal, wherein an output of the second flip-flop is set to a "0" state or to a "1" state in correspondence with the first input value when the first flip-flop's output changes state; and means, operatively connected to the first and second input terminals and the second flip-flop, for selecting one of the input values as an output of the comparator, wherein the selecting means selects the first input value when the second flip-flop is set to the "1" state, and the selecting means selects the second input value when the second flip-flop is set to the "0" state.

In a second embodiment, the present invention provides an electronic comparator for selecting and outputting the larger of first and second electrical, binary-coded input values presented bit-serially, most-significant-bit first, comprising: first and second input terminals; a logical exclusive-OR gate operatively connected to the first and second input terminals for forming a signal indicating a logical exclusive-OR of the first and second input values; a first flip-flop operatively connected to the logical exclusive-OR gate for registering a value indicating whether corresponding bits of the first and second input values are equal or unequal, wherein the first flip-flop registers the value in synchrony with a train of bitclock pulses applied to the first flip-flop; a second resettable flip-flop operatively connected to the first flip-flop, wherein an output of the second flip-flop is set from a "0" state to a "1" state when the value registered by the first flip-flop indicates the two input values, bits are unequal; a third flip-flop operatively connected to the second flip-flop and the first input terminal, wherein an output of the third flip-flop is set to a "0" state or to a "1" state in correspondence with the first input value's bit when the second flip-flop's output changes state; and means, operatively connected to the first and second input terminals and the second and third flip-flops, for selecting one of the input values as an output of the comparator, wherein the selecting means selects the logical OR gate signal as the output when the second flip-flop is in the "0" state, and the selecting means selects the first input value as the output when the third flip-flop is set to "1", and the selecting means the second input value as the output when the third flip-flop is set to "0".

In other aspects, traceback signals to indicate which of the first and second input values was selected by the selecting means and a signal indicating that the maximum value has been identified are also provided.

BRIEF DESCRIPTION OF THE DRAWINGS

The features and advantages of the invention will be understood after reading the following detailed description in conjunction with the drawings, in which:

FIG. 1 illustrates a binary tree structure for finding the greatest of eight values;

FIG. 2A is a block diagram of one embodiment of a bit-serial, most-significant-bit-first comparator in accordance with the present invention;

FIG. 2B is a block diagram of a structure of the comparators of FIG. 2A for finding the greatest of eight values;

FIG. 3 is a block diagram of another embodiment of a comparator in accordance with the present invention; and FIG. 4 is a diagram of a means for generating a signal that indicates that the maximum value has been identified.

DETAILED DESCRIPTION

While portions of the present description are given in a context of cellular communications systems involving portable or mobile radio telephones and/or personal communication networks, it will be understood by those skilled in the art that the present invention may be used in other applications. In addition, binary values that are always positive, with 00...0 being the smallest value and 11...1 being the largest value, are described, but it will be understood that the description is readily adapted to other binary formats.

As an aid in understanding the present invention, a process or apparatus for determining the greatest (or the least, for that matter) of a set of M values can be visualized as a binary tree that is symmetric, or regular, when $M=2^N$. For example, when $M=8$ as shown in FIG. 1, pairs of the M input values $V_0$-$V_7$ are compared in a first stage of a tree 10 having $M/2=4$ comparators 11-1 to 11-4; the larger value of each pair is selected and passed to a second stage having $M/4=2$ comparators 12-1, 12-2. The larger values of the two pairs are passed to the final, third stage having $M/8=1$ comparator 13, which passes the largest value $V_{MAX}$ to its output. It will be appreciated that the number of stages needed for searching the M input values is just N.

Even sets of input values generating asymmetric trees can be efficiently processed by a tree structure like that shown in FIG. 1 but in which appropriate ones of the comparators are absent. For example, if only input values $V_0$-$V_7$ were presented in FIG. 1, the comparators 11-3, 11-4 and 12-2 could be eliminated and the input value $V_4$ could be presented directly to the comparator 13. Alternatively, an asymmetric tree can be made symmetric by padding with a sufficient number of input zeroes or other known values. For the previous example, the input values $V_5$-$V_7$ could be set to zero and presented to the tree 10 shown in FIG. 1.

In one aspect of the invention, the tree structure is advantageously implemented by a suitable number of comparators that each compare two input values presented bit-serially, most-significant-bit ("MSB") first, and pass the larger of the two with substantially no delay. Such comparators stand in marked contrast to conventional comparators that are based on bit-serial subtraction and compare values presented least-significant-bit first. In another aspect of the invention, each comparator generates a traceback bit for identifying the larger of its input values and passes traceback bits for identifying the comparators in the preceding stages that were deemed to have furnished the larger input values. It will be appreciated that such bit-serial, MSB-first comparators can be implemented in a suitable, otherwise conventional, integrated circuit.

FIG. 2A illustrates one embodiment of a bit-serial, MSB-first comparator 100 according to the present invention that could implement the tree of FIG. 1. A pair of binary-coded values are presented bit-serially, MSB first, on inputs A and B to an otherwise conventional exclusive-OR ("XOR") gate 102 that produces a logic HIGH, or "1", output when the values on inputs A and B are unequal. Since the pair of input values are presented and compared bit by bit, MSB first, the input value having the binary "1" will be recognized as the larger on the first occasion that two unlike bits are encountered. (It will be appreciated that as long as the input bits are the same, it cannot be known which value is the larger, but in that case it does not matter which of the two inputs is passed to the output.)

When the output of the XOR gate 102 goes HIGH, indicating that the inputs A, B, are different, it sets a latch 104 that remains set for the rest of the bits of lo the pair of input values. The latch 104, which may be a conventional set-reset flip-flop, also has a reset input for a suitable control signal for initializing the latch output to logic LOW, or "0", before the first and between sets of input values. The output of the latch 104 is connected to the clock input of a D-type flip-flop 106; thus, when the output of the latch 104 goes HIGH, the value of one of the inputs (input A, for example) is clocked into the flip-flop 106.

As seen in FIG. 2A, when the A input value is 20 larger than the B input value (e.g., A's MSB is a "1" and B's MSB is a "0"), the Q output of the flip-flop 106 goes HIGH. The Q output acts as a control signal indicated by the dotted line that causes an input-selector switch 108, such as a field-effect transistor ("FET"), to switch to the "1" position as shown, thereby connecting the A input to the comparator output for the rest of the pair of input values. In the embodiment shown in FIG. 2A, the $\overline{Q}$ output of flip-flop 106 is not used.

On the other hand, if the A input is a "0" when the output of the latch 104 goes HIGH, the A input is again clocked into the flip-flop 106, and the Q output goes LOW, causing the input-selector switch 108 to switch to the "0" position. Thus, the B input is connected to the output for the rest of the pair of input values. As noted above, because the input values are presented MSB first, it does not matter which input value is connected to the output before the output of the XOR gate 102 goes HIGH.

It will be appreciated that the Q output of the flip-flop 106 indicates which of the two inputs was selected (i.e., which value was "1"), and thus the Q output is provided as the comparator's traceback signal output C. The binary traceback signal can be used as an index of the larger value by arbitrarily assigning its value "0" to input A and the value "1" to input B, for example.

The comparator 100 may also have an associated traceback-selector switch 110 that may have a plurality of poles (only one is shown in FIG. 2A). The state of the switch 110 is also controlled by the Q output of the flip-flop 106, and each pole of the switch 110 passes either an A TRACEBACK or B TRACEBACK signal from comparators in preceding tree stages. The number of poles provided in each traceback-selector switch 110 depends on how many traceback signals are to be passed from the preceding stage and the position of its associated comparator in the binary tree. Thus, a binary tree can be implemented by a suitable plurality of comparators 100 and switches 110 that yields not only the largest value of a set of input values but also the index of the largest value.

For example, if the largest of $M=128$ values were to be found, the tree would have seven stages, the first of which would have sixty-four comparators. The first-stage comparators would need no traceback-selector switches, but each would generate one (a first) traceback signal. Thus, the thirty-two second-stage comparators would each have an associated one-pole traceback-selector switch and would each generate a second traceback signal. The sixteen third-stage comparators would each have an associated two-pole traceback-selector switch and would each generate a third traceback signal. This would continue until the seventh stage, in which the one comparator would have a six-pole traceback-selector switch and would generate a seventh traceback signal. The 7-bit traceback word consisting of the traceback signals passed and generated by the seventh stage would then be the index of the largest of the one hundred twenty-eight input values with the symbols "1" and "0" assigned to the comparator inputs as described above.

The symmetric tree 10 of FIG. 1 implemented by such comparators and traceback-selector switches is illustrated in FIG. 2B. Eight input values $V_0$ to $V_7$ are presented to four first stage comparators 11-1 to 11-4, none of which has a traceback-selector switch but each of which generates one of the first traceback signals $C_1$-1 to $C_1$-4. The outputs of the first stage comparators are fed to the inputs of the two second stage comparators 12-1, 12-2, each of which has a one-pole traceback-selector switch 110-1, 110-2, respectively, for passing one of the pairs of traceback signals $C_1$-1, $C_1$-2, and $C_1$-3, $C_1$-4, respectively, and generates second traceback signals $C_2$-1, $C_2$-2. The outputs of the second stage comparators are fed to the inputs of the third stage comparator 13, which has a double-pole traceback-selector switch 110-3 and generates the third traceback signal $C_3$. One pole of the traceback-selector switch 110-3 passes one of the pair of traceback signals $C_2$-1, $C_2$-2, and the other pole passes one of the pair of outputs from preceding stage traceback selector switches 110-1, 110-2. The output $V_{MAX}$ of the third stage comparator 13 is the largest of the input values $V_0$ to $V_7$.

It will be appreciated that the apparatus illustrated in FIG. 2B outputs and identifies the largest input value in a time no longer than that needed to present them. In fact, the maximal value's identification by the traceback word may be available in significantly less time; for example, a single large-magnitude input value could be identified early. These advantages are potentially available no matter how many input values must be searched. It may sometimes be more efficient from a hardware size and cost point of view, however, to divide large sets of input values into subsets, find the maximal value of each subset, and then find the maximal value of those subset maximal values.

In practice, a binary tree comprised of comparators such as that shown in FIG. 2A could suffer from undesirable logic glitches due to varying propagation delays. Accordingly, FIG. 3 shows a preferred embodiment of a comparator $100 \propto 0$ in accordance with the present invention that avoids such logic glitches. A pair of input binary-coded values are presented bit-serially, MSB first, on inputs A', B', to an otherwise conventional XOR gate 102'. Instead of being connected directly to the SET input of a set-reset flip-flop 104' as in the comparator 100, the output of gate 102' is connected to the D-input of a second D-type flip-flop 103'. The flip-flop 103' is clocked by a BITCLOCK signal that is synchronized to the presentation of the input bits. The Q output of the flip-flop 103' is passed to the SET input of the latch 104', the output of which clocks a D-type flip-flop 106' as in comparator 100.

Besides beneficially eliminating the effects of varying propagation delays by synchronizing the operation of the comparator to the BITCLOCK signal, another effect of the second flip-flop 103' is to delay slightly the result of the decision by gate 102' whether the two input its are the same or different. Thus, if the flip-flop 103' were simply inserted into the comparator 100, the input-selector switch 108 would not take on the correct state until slightly after the input bits were presented, and the wrong value could be temporarily presented at the comparator output.

To avoid temporarily selecting the wrong input value as a result of that delay, a modified input-selector switch 108' comprising five conventional NAND gates 108'-1 to 108'-5 is provided. The input-selector switch 108 ' has three states: (1) an initial state, in which the switch 108, behaves as an OR gate; (2) a select-A state; and (3) a select-B state. In the initial state, the input-selector switch's OR function has the effect that the comparator output promptly goes to "1" when different A and B inputs are presented. Thus, the bit value belonging to the larger input is presented at the output without waiting for the output of the XOR gate 102' to be clocked into flip-flop 103'. In the select-A state, the A value on the input A' is connected to the comparator output, and in the select-B state, the B value on the input B' is connected to the comparator output, both for the rest of the pair of input values as described above.

As seen in FIG. 3, a suitable three-state input-selector switch 108' comprises five two-input NAND gates 108'-1 to 108'-5. With the latch 104' initialized (reset), the NAND gates 108'-1, 108'-2, are both fed with a "0" from the latch before unlike input bits are encountered, forcing their outputs to "1" irrespective of the outputs of the gate 106'. Thus, the outputs of the NAND gates 108'-3, 108'-4, are merely inversions of the A and B inputs, respectively. Also, the output of the gate 108'-5 is the inversion of its (equal) inputs, i.e., A OR B, which is the same as both the A and B inputs so long as the A and B inputs are equal. When the output of XOR gate 102' and the Q output of flip-flop 103' have gone HIGH, latch 104' clocks the A input into the flip-flop 106' and sets a "1" on the inputs of gates 108'-1, 108'-2, thereby passing to gates 108'-3, 108'-4, information about which of the A and B inputs is "1". Thus, an inversion of the Q output of flip-flop 106' (i.e., $\overline{A}$) is presented to the inputs of the gate 108'-4, and an inversion of the $\overline{Q}$ output (i.e., A) is presented to the inputs of gate 108'-3.

If the A input is "1", that "1" and a "1" are presented on the inputs of gate 108'-3, and its output goes LOW. The B-input "0" and a "0" are presented on the inputs of gate 108'-4, and its output goes HIGH. Thus, the output of gate 108'-5 goes HIGH. If the A input is "0", that "0" and a "0" are presented on the inputs of gate 108-'3, and its output goes HIGH. The B-input "1" and a "1" are presented on the inputs of gate 108'-4, and its output goes LOW. Thus, the output of gate 108'-5 again goes HIGH. In either case, the output of gate 108'-5 continues to track the input that was "1" for the rest of the pair of input values.

As described above in connection with FIG. 2A, the Q output of flip-flop 106' indicates which of the A and B inputs was selected, and is output as the traceback signal C'. In addition, FIG. 3 shows the Q output as a control signal for a three-pole traceback-selector switch 110' that passes A and B traceback signals from preceding comparators as described above.

As discussed above, the maximum value's identification by the traceback word can become available after a time period significantly less than that needed to present the input values. A suitable means 112 for generating a signal that indicates that the maximum value has been identified is illustrated in FIG. 4. Such a generating means 112 can be provided with either of the comparators 100, 100', and traceback selectors 110, 110'.

Referring to FIG. 4, the state of a selector switch 114 is controlled by the Q output of the comparator's D-type flip-flop (i.e., either the flip-flop 106 in the comparator 100, or the flip-flop 106' in the comparator 100'). The output of the switch 114 is presented to one input of an AND gate 116, and the other input of the AND gate 116 is connected to the SET output of the comparator's latch (i.e., the latches 104, 104' in the comparators 100, 100', respectively). Those inputs determine the state of the AND gate's output signal D. The signals E, F, that are presented to the inputs of the switch 114 are the outputs from the preceding stage's AND gates 116; it will thus be appreciated that the signals E, F, are different from the traceback signals handled by the selector switches 110, 110'.

The generating means 112 are provided in a manner substantially similar to the manner in which the traceback selector switches are provided. Just as the first stage of the tree does not need any selector switches 110, 110', the first stage of the tree does not need any generating means 112. The signals E, F, that are input to the respective switches 114 in the generating means associated with the tree's second stage are just the SET outputs of either the latches 104 or the latches 104' of the first stage comparators 100 or 100', respectively. When the output of the last stage generating means's AND gate 116 goes to "1", the traceback word presented from the last stage of the tree is valid (viz., the traceback bits identify the maximum value), and the search can be halted.

It is, of course, possible to embody the invention in specific forms other than those described above without departing from the spirit of the invention. The embodiments described above are merely illustrative and should not be considered restrictive in any way. The scope of the invention is given by the appended claims, rather than the preceding description, and all variations and equivalents which fall within the range of the claims are intended to be embraced therein.

We claim:

1. An electronic comparator for selecting and outputting a larger of first and second electrical, binary-coded input values presented bit-serially, most-significant-bit first, comprising:

first and second input terminals;

a logical exclusive-OR gate operatively connected to the first and second input terminals for forming a signal indicating a logical exclusive-OR of the first and second input values;

a first resettable flip-flop operatively connected to the logical exclusive-OR gate, wherein an output of the first flip-flop is set from a "0" state to a "1" state when the exclusive-OR gate signal indicates the first and second input values are unequal;

a second flip-flop operatively connected to the first flip-flop and the first input terminal, wherein an output of the second flip-flop is alternatively set to ether a "0" state or a "1" state in correspondence with the first input value in response to the fist flip-flop's output changing state; and first selecting means, operatively connected to the first and second input terminals and the second flip-flop, for selecting one of the input values as an output of the comparator, wherein the first selecting means selects the first input value when the second flip-flop is set to the "1" state, and the first selecting means selects the second input value when the second flip-flop is set to the "0" state.

2. An electronic comparator according to claim 1, wherein the second flip-flop generates a traceback signal to indicate which of the first and second input values was selected by the first selecting means.

3. An electronic comparator according to claim 2, further comprising second selecting means, responsive to the traceback signal, for alternatively selecting either a first traceback signal associated with the first input value or a second traceback signal associated with the second input value based on the input value selected by the first selecting means.

4. An electronic comparator according to claim 3, further comprising means, operatively connected to the first and second flip-flops, of generating a signal that includes that the larger value has been identified.

5. An electronic comparator for selecting and outputting a larger of first and second electrical, binary-coded input values presented bit-serially, most-significant-bit first, comprising:

first and second input terminals;

a logical exclusive-OR gate operatively connected to the first and second input terminals for forming a signal indicating a logical exclusive-OR of the first and second input values;

a first flip-flop operatively connected to the logical exclusive-OR gate for registering a value indicating whether corresponding bits of the first and second input values are equal or unequal, wherein the first flip-flop registers the value in synchrony with a train of bitclock pulses applied to the first flip-flop;

a second resettable flip-flop operatively connected to the first flip-flop, wherein an output of the second flip-flop is set from a "0" state to a "1" state when the value registered by the first flip-flop indicates the two input values' bits are unequal;

a third flip-flop operatively connected to the second flip-flop and the first input terminal, wherein an output of the third flip-flop is alternatively set either to a "0" state or a "1" state in correspondence with the first input value's bit in response to the second flip-flop's output changing state; and first selecting means, operatively connected to the first and second input terminals and the second and third flip-flops, for selecting one of the input values as an output of the comparator, wherein the first selecting means selects the logical OR of the first and second input values as the output when the second flip-flop is in the "0" state, and the first selecting means selects the first input value as the output when the third flip-flop is set to "1", and the first selecting means selects the second input value as the output when the third flip-flop is set to "0".

6. An electronic comparator according to claim 5, wherein the third flip-flop generates a traceback signal to indicate which of the first and second input values was selected by the first selecting means.

7. An electronic comparator according to claim 6, further comprising second selecting means, responsive to the traceback signal, for alternatively selecting either a first traceback signal associated with the first input value or a second traceback signal associated with the second input value based on the input value selected by the first selecting means.

8. An electronic comparator according to claim 6, further comprising means, operatively connected to the second and third flip-flops, for generating a signal that indicates that the larger value has been identified.

9. An electronic logic circuit for selecting and outputting a maximum of a plurality of electrical binary-coded values comprising a plurality of selecting means for selecting and outputting a larger of two selecting means input values, the plurality of selecting means being tree-connected to form a tree of selecting means and each selecting means including means for generating a traceback signal to indicate which of the two selecting means input values was selected, wherein pairs of the plurality of values are presented bit-serially, most-significant-bit first, to respective first ones of the selecting means disposed in a first stage of the tree, each first selecting means outputting a larger of the two selecting means input values as a first-stage output signal and outputting its traceback signal as a first-stage traceback signal, the first-stage output signals being presented bit-serially, most-significant-bit first, to respective second ones of the selecting means disposed in a second stage of the three, and so forth for subsequent stages of the tree until the maximum of the input values is passed as an output signal from a last selecting means disposed in a last stage of the tree, and the first-stage traceback signals being presented to respective second ones of the selecting means disposed in a second stage of the tree, each second selecting means including means for selecting either the first traceback signal associated with the second selecting means' first selecting means input value or the first traceback signal associated with the second selecting means' second selecting means input value, and so forth for subsequent stages of the tree.

10. An electronic logic circuit according to claim 9, further comprising means, operatively connected to the selecting and outputting means, for generating a signal that indicates that the maximum value has been identified. as the

* * * * *

UNITED STATES PATENT AND TRADEMARK OFFICE
CERTIFICATE OF CORRECTION

PATENT NO. : 5,187,675
DATED : February 16, 1993
INVENTOR(S) : Dent et al.

It is certified that error appears in the above-identified patent and that said Letters Patent is hereby corrected as shown below:

Column 10,
Line 21, please change "three" to -- tree --.

Signed and Sealed this

Twelfth Day of March, 2002

Attest:

Attesting Officer

JAMES E. ROGAN
Director of the United States Patent and Trademark Office